UNITED STATES PATENT OFFICE.

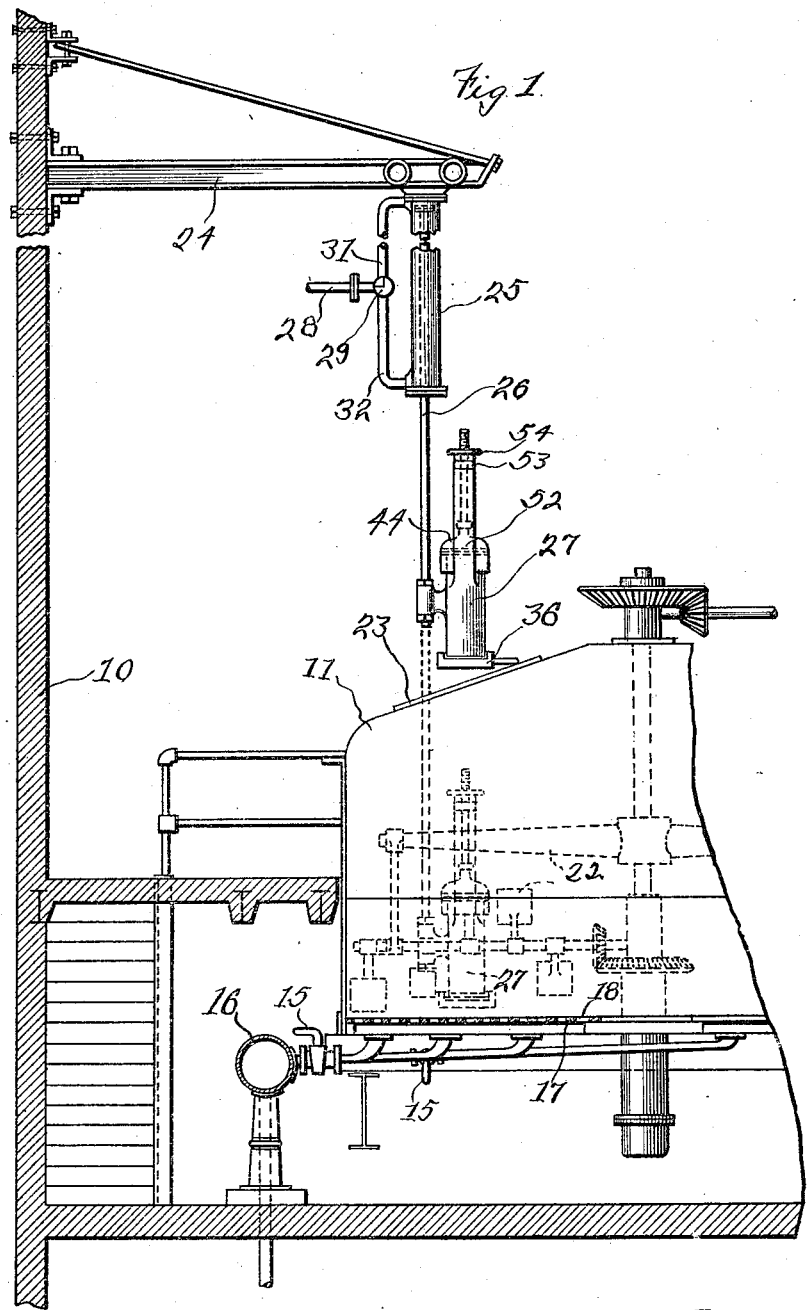

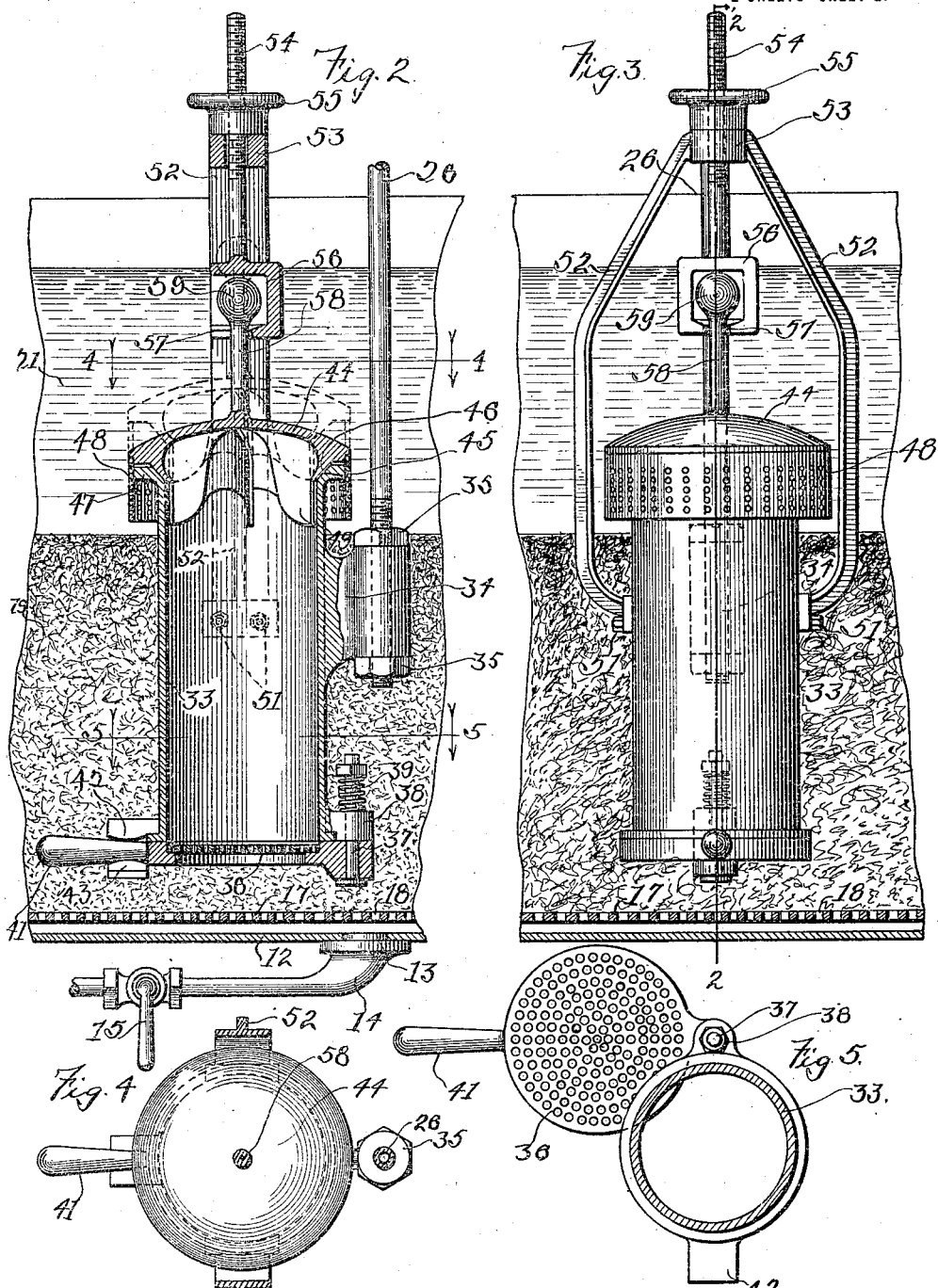

ANDREAS R. KELLER, OF MELROSE PARK, ILLINOIS.

STRAINER APPARATUS.

1,272,458.

Specification of Letters Patent.

Patented July 16, 1918.

Application filed December 27, 1917. Serial No. 209,138.

*To all whom it may concern:*

Be it known that I, ANDREAS R. KELLER, a citizen of the United States, residing at Melrose Park, in the county of Cook and State of Illinois, have invented certain new and useful Improvements in Strainer Apparatus, of which the following is a specification.

My invention relates to a strainer apparatus and has for its primary object the provision of improved means whereby the draining of wort through the mash may be hastened.

A further object of the invention is the provision of a device for hastening the passage of wort through the mash, said device being movable into and out of the path of movement of the stirring apparatus in a mash tub.

Other objects and advantages of my invention will appear from the following description taken in conjunction with the accompanying drawings which form a part of this specification and illustrate the preferred embodiment of my invention.

In the drawings

Figure 1 is a sectional side elevation of a building and a mash tub set therein showing the malt stirring apparatus in dotted lines and illustrating also in dotted lines an adjusted position of the conduit forming a part of the present invention.

Fig. 2 is a vertical section taken approximately on line 2—2 of Fig. 3.

Fig. 3 is a rear elevation of the conduit forming a part of the present invention, and illustrates also a fragmentary sectional view of the mash tub.

Fig. 4 is a section on line 4—4 of Fig. 2.

Fig. 5 is a section on line 5—5 of Fig. 2.

Reference numeral 10 indicates a building within which is mounted a mash tub 11 of any desired type. The bottom of the tub comprises a metal sheet 12 communicating at 13 with discharge pipes 14 controlled by valves 15, as shown in Figs. 1 and 2, from which liquid drained out of the mash tub passes into a main wort pipe 16. Spaced slightly above the bottom 12 is a screen 17 in the mash tub formed with fine slots 18 through which liquid percolates but which are too narrow to admit the passage of whole grains. At 19 in Fig. 2 is indicated a mass of mash above which is shown a body of wort 21 resulting from the steaming of the mash. The steaming apparatus is not illustrated as it forms no part of the present invention. In dotted lines in Fig. 1 is illustrated stirring apparatus generally indicated at 22 which in a well-known manner travels about the interior of the mash tub and stirs the mash during the heating thereof. A removable cover 23 covers an opening provided in the upper wall of the tub 11.

A boom 24, or any other suitable supporting device, is mounted above the tub on the wall of the building 10 and movably supports a hydraulic cylinder 25 within which is mounted a piston not shown. The piston is secured to the upper end of a rod 26 which at its lower end carries the wort conduit generally indicated at 27 in Fig. 1. A water pipe 28 connected to any suitable source of supply connects through a valve 29 with an upper branch water pipe 31 and a lower branch water pipe 32, these pipes respectively communicating with the upper and lower extremities of the interior of the cylinder 25. If desired any other suitable mechanism power or hand operated may be employed for lowering into the tub and for elevating therefrom the conduit generally indicated at 27. As best indicated in Fig. 1, the conduit 27 is movable from the full line to the dotted line position shown in that figure. Its dotted line position, that is its operative position within the mash tub, is shown best in Fig. 2.

The conduit which I have indicated generally at 27 in Fig. 1 comprises a tube 33 carrying a side bracket 34 which is vertically bored for engagement with the supporting rod 26 to which it is secured by means of nuts 35. The lower end of the tube is spanned by a foraminated gate 36 pivoted as at 37 to a lug 38 formed at the bottom of the tube and held by means of a spring 39 in any desired position about its pivotal axis. Preferably the gate 36 carries an operating handle 41 by means of which it is manipulated and which, in the closing of the gate, is wedged between upper and lower wedge members 42 and 43 carried on the tube 33. A cover 44 normally closes the upper end of the tube 33 but is movable vertically with respect to the tube. Preferably the inner edge of the upper end of the tube is beveled as at 45 and a flange 46 constituting in effect a valve, engages the beveled edge 45 to tightly close the upper end of the tube. The upper end of the tube is provided with an out-turned peripheral horizontal flange 47, and fitting closely against this flange 47 is a cylindrical screen 48 depending from the edge of cover 44. Preferably the lower face of the cover carrier guiding arms 49 which engage the inner surface of the tube and guide the cover in its vertical reciprocation and thus relieve the screen from distortion. Secured to opposite sides of the tube by bolts 51 is a yoke 52 having a head 53 through which a threaded rod 54 travels freely. Bottomed upon the head 53 is an operating nut 55 threaded upon the rod 54. By rotation of nut 55 rod 54 is elevated or lowered with respect to yoke 52 and tube 33. Carried at the lower end of rod 54 is a socket 56 having one side open and having its bottom slotted as at 57 from the open side of the socket slightly past the center thereof. Fixed upon the center of the cover 44 and extending upwardly therefrom is a post 58 formed at its upper end with a ball 59, the post 58 traversing slot 57, and the ball 59, which is larger than the slot, standing within the socket. It will be seen that by this construction the cover is suspended upon rod 54 and moves upward or downward with that rod according to the manipulation of nut 55.

In the operation of my invention the ordinary grain mixture is heated in the mash tub 11 and stirred by the apparatus 22 in the well-known manner. This action results in the formation of the mass of mash 19 and the body of liquid wort 21 standing above the same. Heretofore, opening valves 15, the passage of the wort downwardly through the mash and into the main wort pipe 16 has occupied approximately 3 hours. In order to hasten this operation I lower the tube 33 into the position shown in full lines in Fig. 2 and in dotted lines in Fig. 1. The gate 36 now stands spaced somewhat above the foraminated plate 17 near the bottom of the mash tub, the distance between the plate 17 and gate 36 being determined by the operator and being normally governed by the speed necessary in delivering wort from the tub or, on the other hand, the amount of contact desirable between the wort 21 and the mash 19 in order to properly flavor the wort. The tube 33 is of sufficient length to extend from the slightly spaced relation which its lower end bears to the plate 17, upwardly to a point slightly above the upper level of the mash 19. With the tube 33 so positioned the operator manipulates the nut 55, elevating the cover 44 and screen 48 into the position shown in dotted lines in Fig. 2, whereupon the wort flows through the interstices of screen 48 and drops through the tube and through gate 36 from whence it flows through the relatively thin body of mash between gate 36 and plate 17 on to the bottom 12 of the tub. By reason of the fact that the depth of mash through which the wort now passes is greatly reduced from the total depth of mash 19 normally present in a mash tub, it will be seen that the flow of the wort from the tub is greatly accelerated but nevertheless the wort passes through a sufficiently deep mass of mash to accomplish desirable flavoring results.

During the time that the tube 33 is positioned within the tub 11 the stirring apparatus 22 remains stationary, and the rod and its operating devices are provided both for the purpose of removing the conduit 27 from the path of movement of the stirring apparatus 22, and also to permit ready access to the conduit and its parts for cleaning. It is further to be observed that by the construction above described the cover and screen 48 are readily removed from the tube, whereby the cleaning of the tube and its parts is facilitated.

While I have illustrated and described the preferred embodiment of my invention, it will be obvious that one skilled in the art may make modifications thereof without departing from the spirit of the invention. I wish therefore not to be restricted to the precise embodiment shown except in so far as the same is limited in the appended claims.

I claim:

1. In strainer apparatus, the combination with a mash tub of a tube movable into the mash contained in the tub and of sufficient length to extend from a position near the bottom of the tub to the upper level of mash in the tub, and screens for the upper and lower ends of said tube.

2. In strainer apparatus, the combination with a mash tub of a tube insertible therein and of sufficient length to afford communication between the wort above the body of mash in the tub to a point near the bottom of the tub, and means for raising and lowering said tube from and into the tub.

3. In strainer apparatus, the combination with a vertically extending tube of a valve controlling the upper end of said tube, and an encircling screen carried by said valve and overlapping and closely fitting the outer periphery of the tube.

4. In strainer apparatus, the combination with a vertically extending tube of a valve controlling the upper end of said tube, and encircling screen carried by said valve and overlapping and closely fitting the outer periphery of the tube, guides carried on the bottom of said valve and engaging the inner periphery of the tube, and means for reciprocating the valve with respect to the tube.

5. In strainer apparatus, the combination with a tubular element formed with a valve seat at its upper end of a cover for said tube, a flange engaging said valve seat and constituting a valve for closing the upper end of the tube, and a screen encircling and closely fitting the periphery of the tube and surrounding and carried by the cover.

6. In strainer apparatus, the combination with a tube of means for vertically reciprocating said tube, a yoke carried by the tube, a cover for the upper end of the tube, a threaded rod carried in the yoke above said cover, an operating nut threaded upon said rod and bottomed upon the yoke, a socket carried at the lower end of said rod, and a ball secured to the upper surface of said cover and carried in the socket.

7. In strainer apparatus, the combination with a tube of means for vertically reciprocating said tube, a yoke carried by the tube, a cover for the upper end of the tube, a threaded rod carried in the yoke above said cover, an operating nut threaded upon said rod and bottomed upon the yoke, a socket carried at the lower end of said rod, and a ball secured to the upper surface of said cover and carried in the socket, said ball being removable from the socket.

8. In strainer apparatus, the combination with a tube of means connected therewith for raising and lowering the same, a cover coacting with the upper end of the tube to close the same, a screen carried by the cover and movable therewith to span the space between the cover and the upper end of the tube in the elevated position of the cover, and means carried by the tube for elevating and lowering the cover with respect to the tube.

9. In strainer apparatus, the combination with a vertically disposed tube of a yoke secured to the body of the tube exteriorly thereof and extending upwardly, a head formed in the yoke, a threaded rod slidable through a vertical aperture provided in said head, an operating nut threaded upon the rod and bottomed upon the top of said head, an open sided socket formed with a bottom aperture communicating with the open side edge of the socket, a cover for the tube, a post extending upwardly from the cover in substantial alinement with said rod, and a ball formed at the upper end of said post and mounted in the socket.

10. In strainer apparatus, the combination with a mash tub of a vertically disposed tube and means whereby said tube may be positioned within the vat at any desired elevation, said tube being open at its upper and lower ends for passage of fluid therethrough.

In testimony whereof I affix my signature.

ANDREAS R. KELLER.

Copies of this patent may be obtained for five cents each, by addressing the "Commissioner of Patents, Washington, D. C."